United States Patent
Thornhill et al.

[15] 3,649,842
[45] Mar. 14, 1972

[54] SIGNAL GENERATION

[72] Inventors: William J. Thornhill; Richard O. Welty, both of c/o Phillips Petroleum Co., Bartlesville, Okla. 74003

[22] Filed: Apr. 30, 1969

[21] Appl. No.: 820,585

[52] U.S. Cl. .............................................................. 307/106
[51] Int. Cl. ............................................................ H03k 3/00
[58] Field of Search ............ 307/106; 137/455, 505, 505.13; 340/240, 222; 328/59, 60, 62, 69

[56] References Cited

UNITED STATES PATENTS 3,181,014  4/1965  Clark ................................. 307/106 X Primary Examiner—Herman J. Hohauser
Attorney—Young and Quigg

[57] ABSTRACT

In order to automatically add measured amounts of a catalyst or other substance to a chemical reaction as needed, a signal representing a specific reaction condition is utilized to generate a pulse which has a width representative of the magnitude of said signal. An integrator then adds the pulses and after a predetermined total pulse time triggers an actuating mechanism which performs the operations necessary to add a substance to the chemical reaction.

9 Claims, 11 Drawing Figures

INVENTORS
W. J. THORNHILL
R. O. WELTY
BY

ATTORNEYS

INVENTORS
W. J. THORNHILL
R. O. WELTY

ATTORNEYS

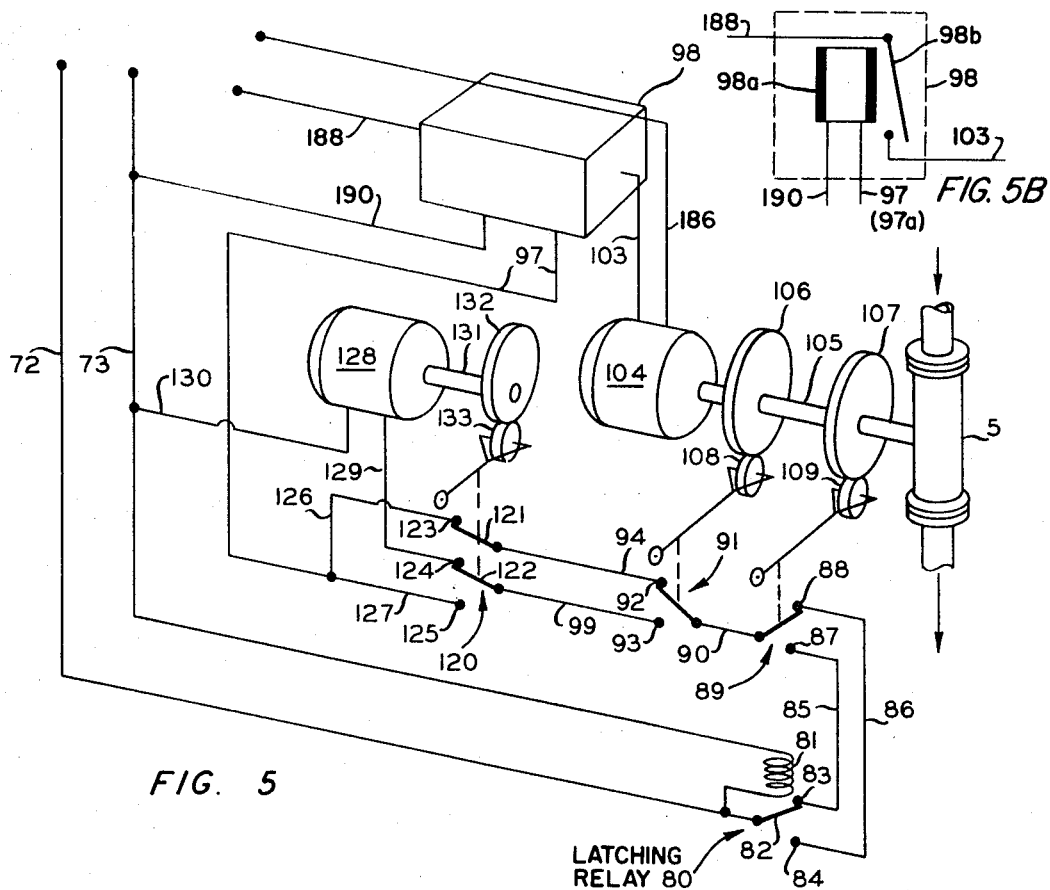
FIG. 5
FIG. 5B
LATCHING RELAY 80
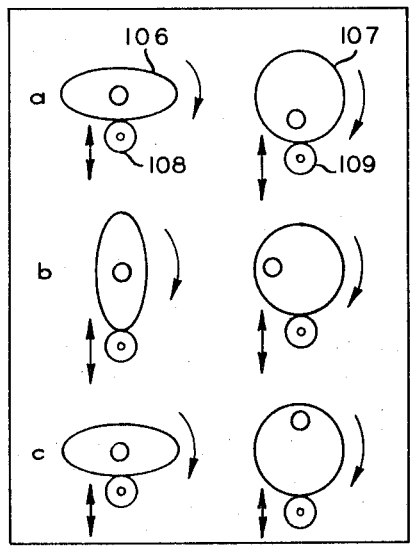
FIG. 6
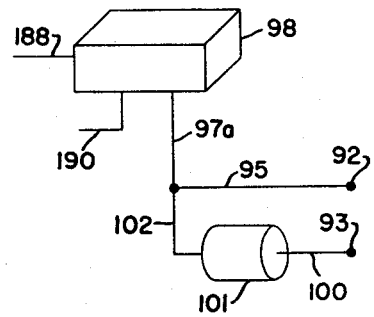
FIG. 5A
INVENTORS
J. W. THORNHILL
R. O. WELTY
BY
ATTORNEYS

PATENTED MAR 14 1972

INVENTORS
J. W. THORNHILL
R. O. WELTY

BY

ATTORNEYS

SIGNAL GENERATION

In U.S. Pat. No. 3,167,398, the disclosure of which is incorporated herein by reference, there is disclosed metering apparatus comprising a rotatable member having a chamber extending therethrough, and means to alternately accumulate and discharge through said chamber as the member is rotated measured amounts of material thereby insuring accurate and controlled feed rate of that material, e.g., catalyst, to a receiver, e.g., a polymerization reactor. The operation of such metering devices requires the rotatable member to be rotated through a finite arc to align the chamber therein with the inlet and exit apertures of the device, pause a finite length of time to allow substantially complete discharge of the material in the chamber through the exit aperture and charging of a second chamber to be subsequently discharged, and then rotated through another finite arc to move and hold the chamber from communication with the exit aperture until another measured amount of material is desired to be discharged. Generally, the cycle rate of such metering devices is presently manually set by an operator and remains at the set cycle rate until reset by an operator regardless of changes in the process which the device is feeding. These changes generally require a change in the feed rate, i.e., cycle rate of the device, thereto. Thus, it is extremely important to have an operation wherein the cycle rate of the metering device is responsive to at least one process variable and/or at least one property of the product.

However, it was found that conventional cyclic actuators could not effect a sufficiently lengthy pause between the two arcs of rotation in the cycle of the metering device and therefore did not allow sufficient time for the chamber of the metering device to completely discharge the desired quantity of material. Attempts to adjust these conventional actuators only resulted in jerky, erratic motion causing considerable leakage of the metering device as well as increased wear and generally poor performance of that device.

Broadly, a method of this invention involves producing a signal of variable time interval—constant duration pulses which signal is in proportion to a signal representative of a measured process variable and/or a property of the product. This method includes first producing a signal of variable duration—constant time interval pulses which signal is proportional to the signal representative of the process and/or property and then converting that signal to the desired signal of variable time interval—constant duration pulses.

By variable duration—constant time interval pulses, it is meant a signal, be it electrical, hydraulic, pneumatic, and the like, which is broken up into substantially constant time intervals and during each time interval there is produced a pulse, e.g., a flow of electrons, etc., which will last for a variable time duration depending upon the magnitude of the signal representative of the process variable and/or property measured, but the maximum of which duration is equal to or less than the time interval in which that pulse is produced. For example, if the time interval is 10 seconds, a pulse produced during that time interval can vary from 0 to 10 or slightly less than 10 seconds and if the signal representative of the process variable and/or property increases in magnitude, e.g., in the case of pneumatic signal increases in pressure, the time duration of each pulse in each time interval will increase toward the 10-second maximum until the first signal remains constant or decreases in magnitude in which case the time duration of each pulse in each time interval will become constant or decrease in length, respectively. By variable time interval—constant duration pulses, it is meant a signal wherein each pulse produced lasts for the same time duration but that each substantially constant time duration pulse is separated from the other by a variable time interval so that as the time duration of each pulse in the variable time duration—constant time interval signal increases in response to increased magnitude of the signal representative of the process variable and/or property, the time interval between the constant duration pulses in the variable time interval—constant duration pulse signal becomes less and therefore is in proportion to the magnitude of the first signal representative of the process variable and/or property. Generally, the first signal as with the other signals mentioned above can be electrical, pneumatic, hydraulic and the like, and is composed of a pulse having an indefinite and variable time duration and having a varying magnitude during that time duration.

Further according to this invention a variable duration pulse generator is provided which during substantially equal successive time intervals produces a source of fluid under pressure and passes said fluid past a pressure switch and out of the system. Depending upon the pressure of the fluid passing through the pressure switch, that switch may not close at all or may be closed for any length of time up to the length of the time interval during which the fluid is passed through the pressure switch. The variable duration pulse, i.e., the time in each interval during which the pressure switch is closed, is accomplished by varying the rate of flow of the pressurized fluid through the pressure switch in response to the magnitude of the signal responsive to the measured process variable and/or property of the product. This apparatus can function electrically, pneumatically, hydraulically, etc.

In the drawing,

FIG. 5 shows a metering device actuating mechanism.

FIG. 5A shows an alternative time delay means which can be used in the metering device actuating mechanism of FIG. 5.

FIG. 5B is a schematic electrical representation of solenoid actuated relay switch 98 which is shown in FIGS. 5 and 5A.

FIG. 6 shows relative relationships of the cams of the apparatus of FIG. 5 during one cycle of operation.

Figure 1:
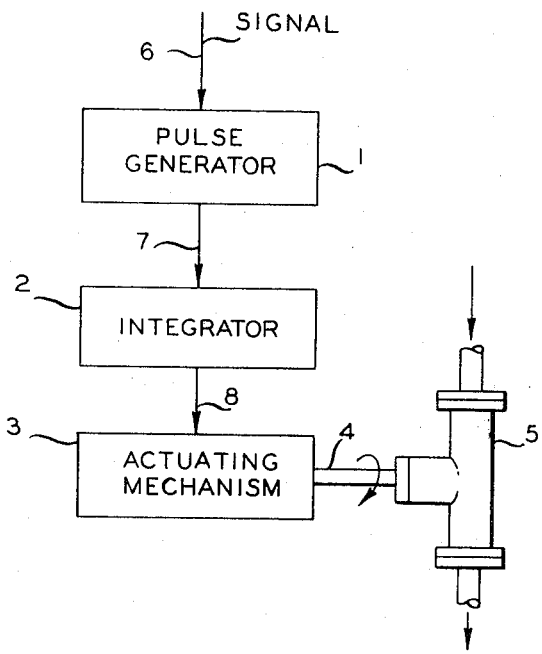
FIG. 1 shows schematically a system utilizing the pulse generating apparatus of this invention.

FIG. 1 shows a variable duration pulse generator 1 connected to an integrator 2 which in turn is connected to metering device actuating mechanism 3. Actuating mechanism 3 is connected through shaft 4 to metering device 5. Signal 6 is the first signal or signal representative of a measured process variable and/or property of the product. If desired, first signal 6 can be an arbitrarily selected, manually produced signal. As an example, signal 6 can be the output signal of a conventional temperature recorder controller which is operatively connected in a conventional manner through a differential thermocouple device to the interior of a pipe carrying therethrough cooling water on its way to the cooling jacket of a polymerization reactor. If signal 6 is pneumatic, it is preferably in the range of 3 to 15 p.s.i.g. The sensed differential temperature of the cooling water entering and leaving the jacket will determine the magnitude of the output signal of the temperature recorder controller and it is this signal and the magnitude thereof which determines the duration of the pulse in each time interval of the intermediate signal 7 put out by variable duration pulse generator 1. If the output signal of the temperature recorder controller is, for example, pneumatic an increase in the pressure of this signal, representing an increase of temperature of the monomer in the pipe, is impressed on the variable duration pulse generator and the effects thereof are shown in detail in the discussion of FIG. 2, infra. Signal 7 from generator 1 is then passed to integrator 2 which converts signal 7 to signal 8 which signal is composed of a series of pulses each of substantially the same time duration and each separated from the other by variable time intervals. Signal 8 is then used to activate actuating mechanism 3 which converts signal 8 to a rotary mechanical motion manifested in the rotation of shaft 4 which in turn operates metering device 5 in the cyclical manner required by that device. Metering device 5 can be that apparatus disclosed in U.S. Pat. No. 3,167,398, and similar known types of apparatus.

Thus, due to the measured change of a process variable which is passed to generator 1 in the form of signal 6 the variable duration pulse put out by generator 1 in the form of signal 7 is changed accordingly and the variable time interval put out by integrator 2 is also changed accordingly so that the actuating mechanism 3 which operates in response to signal 8 is also accordingly effected and in turn operates metering device 5 in relation to the effect thereon by signal 8 thereby causing the cyclical operation of metering device 5 to be responsive to the change in the process variable manifested in signal 6. If the temperature of the monomer increases above normal the pressure of the pneumatic signal 6 increases which increases the duration of each pulse in each time interval of signal 7 which shortens the time interval between constant duration pulses of signal 8 which actuates mechanism 3 faster than is normal with the result that metering device 5 is operated faster than normal.

Figure 2:
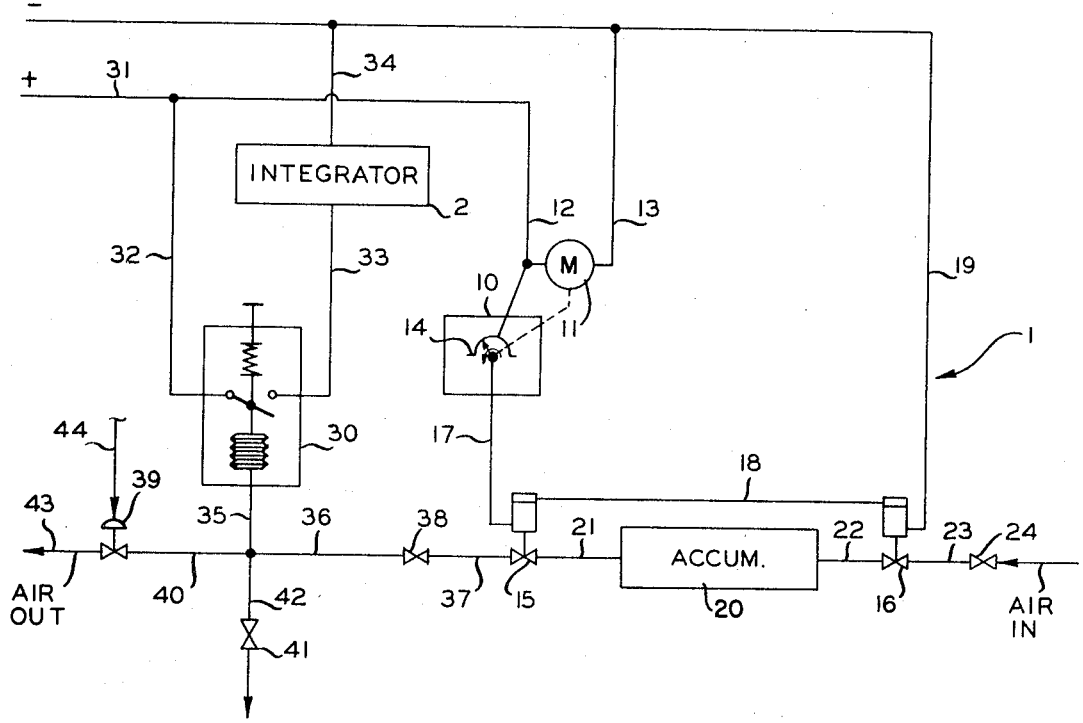
FIG. 2 shows a variable duration pulse generator of this invention.

In FIG. 2 there is shown a variable duration pulse generator wherein a cam switch 10 is driven by a motor 11 so that for a given interval of time the cam switch is open a part of the interval and closed another part of that interval, and this sequence is repeated continually thereby producing a continuous series of substantially constant time intervals. Switch 10 and motor 11 are electrically connected by electrical lines 12 and 13 so that motor 11 constantly drives cam switch 10 and when cam switch 10 is contacting element 14 an electrical circuit is closed between normally open solenoid valve 15 and normally closed solenoid valve 16 by means of electrical lines 17, 18, and 19. Between valves 15 and 16 is air accumulator 20 which is in open communication with valves 15 and 16 through pipes 21 and 22, respectively. Accumulator 20 is openly connected to a source of air through conduit 22, valve 16 and conduit 23. The amount of air passed into accumulator and therefore the maximum pressure of the air in accumulator 20 produced while normally closed valve 16 is open is controlled by needle valve 24.

Normally open pressure switch 30 is electrically connected to integrator 2 through electrical lines 31, 32, and 33. Integrator 2 is also connected to conduit 19 by electrical line 34. Pressure switch 30 is openly connected through pipes 35, 36, and 37 to valve 15 and accumulator 20. Throttle valve 38 is openly connected between pipes 36 and 37 and adapted to vary the rate of flow of air from accumulator 20 into pipe 36.

Pipe 36 is also in open communication with motor valve 39 through pipe 40 and bleed valve 41 through pipe 42. Air from accumulator 20 passes out of the system via pipe 43. The rate at which air passes out of the system through 43 can be varied by varying the opening of throttle valve 39 in response to the magnitude of the pressure of a pneumatic air signal passing to motor valve 39 through pipe 44. The air signal in conduit 44 is the signal that is representative of the measured process variable and/or property of the product.

In operation and by way of example, cam switch 10 and timing motor 11 are adjusted to produce a time interval of 10 seconds. That is, the substantially constant time intervals in the signal passed to integrator 2 through line 33 is 10 seconds. During the first portion of the 10 second interval, about 2 seconds, the cam switch is actuated by contacting member 14 thereby closing normally open valve 15 and opening normally closed valve 16 so that air is passed into accumulator 20 and is allowed to accumulate to a predetermined maximum pressure, in this example 25 p.s.i.g. After passage of this first portion of the time interval cam switch 10 is deactivated by moving from contact with member 14 and normally open valve 15 is opened and normally closed valve 16 is closed thereby allowing the pressurized air in accumulator 20 to pass through pipes 21, 37, 36, 40, and 43 out of the system and also into pipe 35 where sufficient pressure will activate pressure switch 30. Bleed valve 41 is adjusted so that when motor valve 39 is substantially completely closed, the pressurized air in accumulator 20 will be lowered to the actuation pressure of pressure switch 30 before the next 10 second interval starts and accumulator 20 is repressurized with new air. Throttle valve 38 can be adjusted so that when motor valve 39 is wide open the pressure in pipe 35 does not reach a pressure sufficient to actuate pressure switch 30, in this example 6 p.s.i.g, or is just sufficiently high to actuate pressure switch 30 for only a small amount of time, for example about 3 seconds.

Thus, when signal 44 varies in magnitude, for example increases in pressure, the opening in motor valve 39 is pinched down to thereby restrict the flow of air therethrough from pipe 40 thereby increasing the pressure in pipe 35 and forcing pressure switch 30 closed for a longer period of time than is normal. When this is effected, a variable duration pulse, in this case of increased duration, is passed through line 33 to integrator 2 during each 10 second time interval. Therefore, a variable duration—constant time interval signal is passed to integrator 2, the variable duration pulse of that signal being responsive to the signal in pipe 44 which in turn is responsive to the measured process variable or property of the product. Generally, the pneumatic signal in pipe 44 will vary from a 3 to 15 p.s.i.g. magnitude.

If pressure switch 30 is adjusted so that under normal conditions it is closed for a finite period of time, the pulse generator of this invention can send pulses of longer duration to the integrator in response to increased pressure of the signal in pipe 44 thereby speeding the operation of integrator 2 or can keep pressure switch 30 open longer than normal thereby sending pulses of shorter duration than normal to integrator 2 thereby slowing the operation of that integrator in response to lower pressures than normal in pipe 44.

Figure 3:
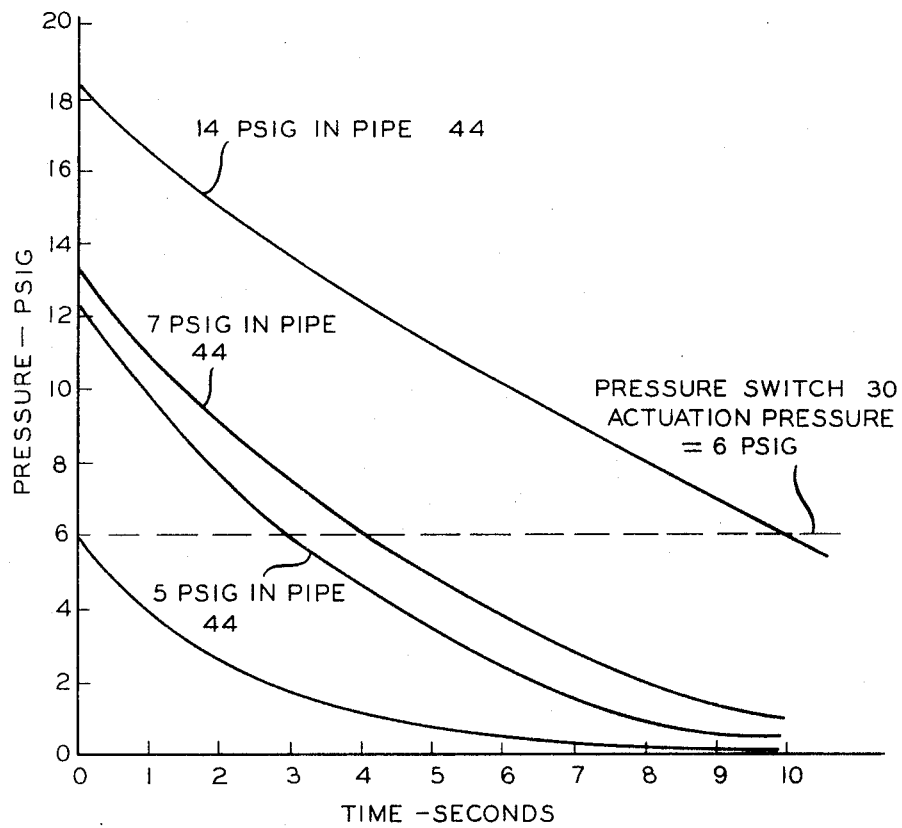
FIG. 3 shows graphically operational characteristics of the apparatus of FIG. 2.

FIG. 3 shows a graph wherein time is plotted against pressure on pressure switch 30 so that when accumulator 20 is charged up to a 25 p.s.i.g. maximum and then allowed to pass its pressurized air out of the system under normal conditions, arbitrarily set as normal at a 7 p.s.i.g. signal in pipe 44, pressure switch 30 will remain closed for 4 seconds. However, if the signal in pipe 44 increases to a magnitude of 14 p.s.i.g. in response, for example, to a temperature increase of the monomer above-mentioned, motor valve 39 will be pinched down so that the pressurized air is not removed from the system until the end of the 10-second time interval and therefore pressure switch 30 stays closed for substantially the whole time interval of 10 seconds. Similarly, if the signal in pipe 44 should fall below the normal 7 p.s.i.g. to 5 p.s.i.g., motor valve 39 will open further thereby allowing the pressurized air in accumulator 20 pass out of the system more rapidly and pressure switch 30 is thereby closed for only 3 seconds. Thus, it can be seen that depending upon the magnitude of the signal in pipe 44 the relation of the pulse sent to integrator 2 during each equal time interval will vary in direct proportion and pulse generator 1 is therefore supplying to integrator 2 a variable duration—constant time interval signal.

Figure 4:
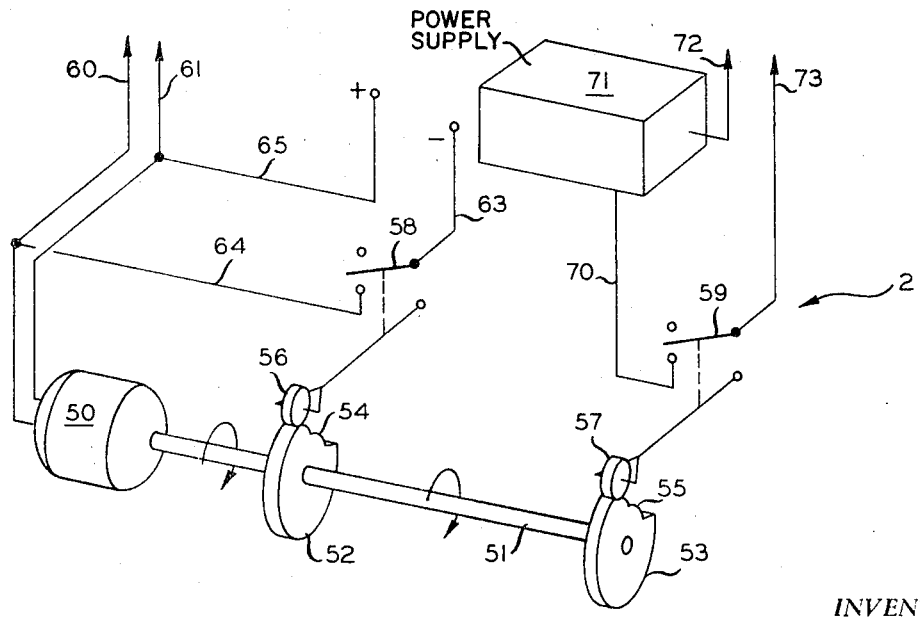
FIG. 4 shows integrator apparatus suitable for use in the system of FIG. 1.

Although any type of conventional apparatus which can receive and store signals of variable duration until a predetermined amount of these signals has been received and then produce a signal of constant duration pulses can be employed as an integrator of this invention, an example of such apparatus is shown in FIG. 4. In integrator 2 of FIG. 4, there is a timer motor 50 which rotates a shaft 51 which in turn carries and rotates two cam means 52 and 53 each with a similar indentation 54 and 55 in the periphery thereof. Cam followers 56 and 57 are connected to electrical switches 58 and 59.

The signal is transmitted from the variable duration pulse generator 1 of FIG. 2 to timer motor 50 by electrical lines 60 and 61. Switch 58 is connected to an electrical power source (not shown) by electrical line 63 and to line 60 by electrical line 64. Electrical line 65 connects the electrical supply source to line 61. Switch 59 is connected through electrical line 70, electrical power supply 71 and electrical line 72, and electrical line 73 to the metering device, actuating mechanism 3 (not shown).

In operation, during each 10 second time interval pulses of varying duration pass by lines 60 and 61 to motor 50 thereby operating same and turning cams 52 and 53 for a time substantially the same as the duration of each pulse. When a sufficient number of pulses of sufficient duration have operated motor 50 long enough to cause indentations 54 and 55 to come into register with cam followers 56 and 57 switches 58 and 59 are tripped and a pulse is sent by way of lines 72 and 73 to actuating mechanism 3. When switch 58 is tripped the electrical sources are connected into motor 50 thereby causing same to continue to operate until cam follower 56 is disengaged from indentation 54 of cam 52 at which time switch 59 is also deactuated and the pulse to the actuating mechanism terminated. Thus, a variable duration pulse—constant time interval signal from pulse generator 1 passes into integrator 2 by lines 60 and 61 and a variable time interval—constant duration pulse signal is passed from integrator 2 by lines 72 and 73 to the actuating mechanism 3.

FIG. 5 shows interval—actuating mechanism of this invention wherein the variable time interval—constant duration pulse signal from integrator 2 is passed from electrical lines 72 and 73 to latching relay 80 which is adapted by means of coil 81 to, upon receipt of a pulse from integrator 2, switch contacting arm 82 from the contact on which it was left upon termination of the last received pulse (as shown in FIG. 5 contact 83) to the other contact 84 in latching relay 80. Contacts 83 and 84 are connected by electrical conduits 85 and 86 to contacts 87 and 88 of switch 89. Switch 89 is connected by electrical line 90 to switch 91. Contact 92 is connected by way of electrical line 94 to switch 120 which has two contacting arms 121 and 122 and three contacts 123, 124, and 125. Contacts 123 and 125 are connected through lines 126 and 127 respectively to line 97 for control of solenoid actuated relay switch 98. Details of the operation of solenoid actuated relay switch 98 are shown in FIG. 5B. Contact 124 is connected to the timing motor 128 by electrical line 129. Timing motor 128 is also connected to conduit 73 by electrical line 130. Shaft 131 of motor 128 carries cam 132 which coacts with cam follower 133 which is adapted to move contact arms 121 and 122 between two of the contact points. Switch 98 is connected by electrical line 103 to electrical drive motor 104. Electrical line 186 of motor 104 and 188 of switch 98 are connected to an electrical power source. Motor 104 rotates shaft 105 which shaft carries cams 106 and 107 and which shaft is connected to the rotatable member of metering device 5. Thus, when drive motor 104 rotates shaft 105 cams 106 and 107 and the rotatable member of metering device 5 are all moved together. Cam followers 108 and 109 engage, respectively, cams 106 and 107 and are adapted to trip switches 91 and 89 back and forth from their two contacts.

In operation, the pulse passing through contacts 84, 88 and 92 passes through line 94, a contacting arm 121, contact 123 and lines 126 and 97 to actuate switch 98 and start operation of motor 104. After motor 104 has turned cam 106 90° it moves the contacting arm of switch 91 from contact 92 to 93 which causes the pulse to pass through conduit 99, contact arm 122, contact 124 and line 129 to start operation of timing motor 128. Timing motor 128 turns cam 132 until cam 132 trips switch 120 by moving contacting arms 121 and 122 into contact with contacts 124 and 125, respectively. The time required to cause rotation of cam 132 so that it will trip switch 120 is that amount of time required to allow the chamber in the rotatable member of metering device to substantially completely empty its contents. When switch 120 is tripped the pulse originally passing through contacting arm 122, contact 124 and line 129 is then directed to contact 125 and lines 127 and 97 to reactivate switch 98 and start motor 104 in operation again. After motor 104 has turned cams 106 and 107 through another 90° arc contacting arm in switch 91 is moved from contact 93 to 92 and the contacting arm in switch 89 is moved from contact 88 to contact 87 and operation of the mechanism terminated. When the next pulse arrives it will be directed through contacts 83, 87, 92 and 124 thereby causing operation of timing motor 128 until cam 132 reaches the point where it trips switch 120 back and the pulse is then severed from contact 124 to contact 123 and thereby allows actuation of switch 98 and starts operation of motor 104, to start a new cycle.

FIG. 5A shows an alternative delay means which can be used to replace switch 120, motor 128, cam 132, and cam follower 133 of the FIG. 5 apparatus. Contact 92 of the apparatus shown in FIG. 5 is connected by way of electrical lines 95 and 97a to solenoid actuated relay switch 98. Contact 93 is connected by electrical line 100 to circuit delay device 101, and lines 102 and 97a connect circuit delay device 101 to solenoid actuated relay switch 98.

In the operation of the device of FIG. 5 using this alternative circuit delay device, a pulse received from integrator 2 causes contacting arm 82 to switch from contact 83 to 84 and pass the pulse through contacts 88 and 92 through lines 95 and 97a to switch 98 thereby causing it to close and start motor 104 in operation. After motor 104 has rotated (together with cams 106 and 107 and rotatable member in metering device 5) about 90°, the contacting arm of switch 91 is transferred from contact 92 to contact 93 thereby causing the pulse to pass into circuit delay device 101 which causes the pulse to be held up and thereby interrupts the supply of electricity to switch 98 which causes that switch to return to its normally open position. The circuit delay device 101 can be any conventionally known delay device such as a Cramer Type TEC–15S Style A time delay relay made by the R. W. Cramer Company, Inc., Centerbrook, Connecticut. After a short interval of time which is sufficient in length to allow the chamber in the rotatable member of metering device 5 to substantially completely empty the contents thereof, the pulse is passed by lines 102 and 97a to switch 98 which actuates and again starts motor 104 into operation. After motor 104 has rotated cams 106 and 107 another 90°, the contacting arm in switch 91 is moved from contact 93 back to contact 92 and at the same time contact arm in switch 89 is passed from contact 88 to contact 87. When the contacting arm in switch 89 is passed from contact 88 to contact 87, the mechanism is deactivated and will not be reactivated until a new pulse is received from integrator 2 which pulse will then cause contact arm 82 of switch 80 to move from contact 84 to contact 83.

FIG. 5B is a schematic diagram of solenoid actuated relay switch 98 as it is connected in the apparatus of FIGS. 5 and 5A. When a signal is applied to the coil of solenoid 98a through leads 190 and 97 (or 97a), contact 98b is closed thereby making a connection between line 188 and line 103. When there is no signal applied to the solenoid 98a, contact 98b returns to its open position.

FIG. 6 shows the relationship of cams 106 and 107 as they have rotated through the three stages of each cycle of operation of this mechanism. In Stage A double lob cam 106 and single lob cam 107 are in a position so that no switching will occur until rotated 90° and 180°, respectively. When motor 104 is operated for the first time cams 106 and 107 are rotated 90° at which time cam 106 trips switch 91 but cam 107 still has 90° of rotation to follow through before it will trip switch 89. In Stage C cam 106 is in position to trip switch 91 back to the position it was in in Stage A while cam 107 has reached the first point where it is in a position to trip switch 89 the first time. Thus, in a rotational arc of 180°, which is generally required by the metering device 5, cam 106 trips switch 91 twice while cam 107 trips switch 89 once to end the cycle.

Figure 7:
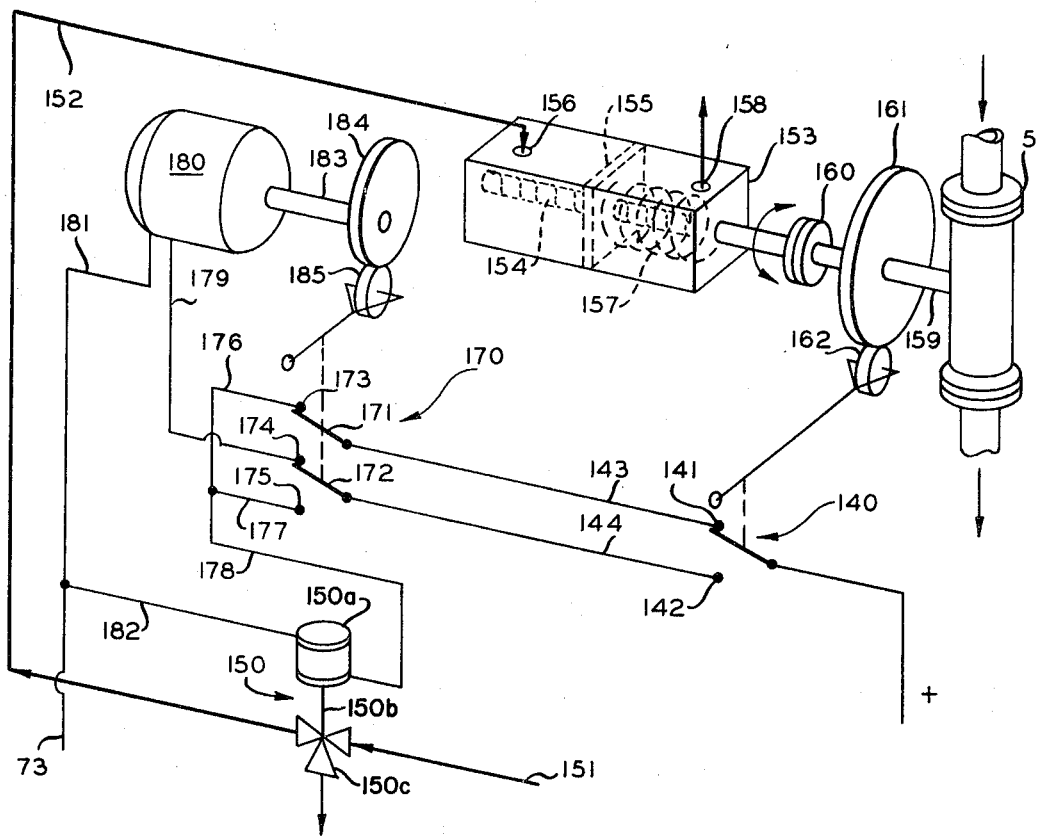
FIG. 7 shows a metering device actuating mechanism.

In FIG. 7 the pulse from integrator 2 passes to switch 140 which has two contacts 141 and 142. Switch 140 is connected through lines 143 and 144 to switch 170 which has two contacting arms 171 and 172 connected to lines 143 and 144 respectively and three contacts 173, 174, and 175. Contacts 173 and 175 are connected by electrical lines 176 and 177 to electrical line 178. Line 178 is connected to solenoid 150a which, along with operating rod 150b and valve 150c, is a part of normally closed solenoid valve 150. Contact 174 is connected through electrical line 179 to timer motor 180. Line 73 is connected to timer motor 180 through line 181 and to solenoid 150a through line 182. Shaft 183 attached to motor 180 carries cam 184. Cam follower 185 coacts with cam 184 to trip switch 170 back and forth between the three contacts. Air passes from a source (not shown) to pipe 151, valve 150c, pipe 152 into pneumatic actuator 153. Actuator 153 contains a threaded shaft 154 with a piston 155 coacting with the threaded portion and biased toward air inlet aperture 156 by resilient means 157. Air is vented from actuator 153 through vent 158. Shaft 154 is connected to shaft 159 by ratchet means 160. Shaft 159 carries cam 161 and is attached to the rotatable member of metering device 5. Cam follower 162 coacts with cam 161 and is adapted to trip switch 140 back and forth from contacts 141 and 142.

In operation the pulse passing through contact 141 passes through line 143, contact 173, and lines 176, 178, to operate solenoid 150a and open valve 150c and cause rotation of cam 161 through a 90° arc. After the 90° rotation cam follower 162 trips switch 140 to contact 142 thereby deenergizing solenoid 150a, closing valve 150c and stopping rotation of shaft 159 and passing the pulse through line 144, contact 174 and line 179 to start operation of timer motor 180. After timer motor 180 rotates cam 184, cam follower 185 trips switch 170 thereby moving contacting arm 172 from contact 174 to contact 175 and causing the pulse to pass through lines 177, 178, and 149 to reopen valve 150c and cause cam 161 to be rotated another 90° at which time switch 140 is retripped and the contact arm moved back to contact 141. Here also the time required to cause cam 184 to rotate a sufficient amount to trip switch 170 is that amount of time required to allow the chamber in the rotatable member of metering device 5 to substantially completely empty its contents. After switch 140 is retripped back to contact 141 any pulse that is left is employed through line 143, contacting arm 171, contact 174, and line 179 to continue operation of timer motor 180. The first portion of the next pulse from integrator 2 is employed in like manner until cam 184 is rotated to a position where it retrips switch 170 so that contacting arms 171 and 172 are again in contact with contact 173 and 174, respectively.

Figure 7A:
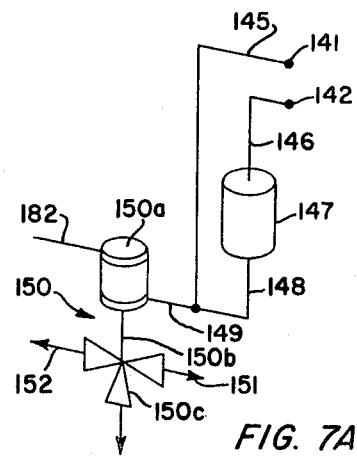
FIG. 7A shows an alternative time delay means which can be used with the metering device actuating mechanism of FIG. 7.

FIG. 7A shows an alternative time delay device which can be used with the apparatus of FIG. 7 in place of switch 170, motor 180, cam 184, and cam follower 185. Contact 142 of switch 140 is connected through line 146 to circuit delay device 147 and then through lines 148 and 149 to solenoid 150a of normally closed solenoid valve 150. Contact 141 is connected to solenoid 150a through electrical lines 145 and 149. Circuit delay device 147 can be the same type of device as disclosed in FIG. 5A.

In operation of the apparatus of FIG. 7 utilizing the alternate delay means of FIG. 7A, the pulse from integrator 2 initially passes through contact 141 and lines 145 and 149 to solenoid 150a which opens valve 150c and causes air to be admitted to actuator 153 for a time sufficient to push piston 155 the distance required to rotate shaft 154 and 159 and ratchet 160 and cam 161 90° at which time cam follower 162 trips switch 140 and transfers contacting arm to contact 142, thus deenergizing solenoid 150a, closing valve 150c, and stopping rotation of shaft 159. The pulse then passes through line 146 into circuit delay device 147 and after the time delay sufficient to allow contents of the chamber of the rotatable member of metering device 5 to be substantially completely removed therefrom, the pulse is passed by lines 148 and 149 to reopen valve 150c and admit air to actuator 153 thereby causing piston 155 to advance another distance sufficient to cause rotation of cam 161 sufficiently to cause cam follower 162 to retrip switch 140 and move the contacting arm back to contact 141 and to complete the 180° rotation of shaft 159 after which the duration of the pulse terminates and resilient means 157 forces the piston back toward the inlet end 156 of actuator 153 which is accomplished without disturbing the rotatable member in metering device 5 due to ratchet 160.

Figure 8:
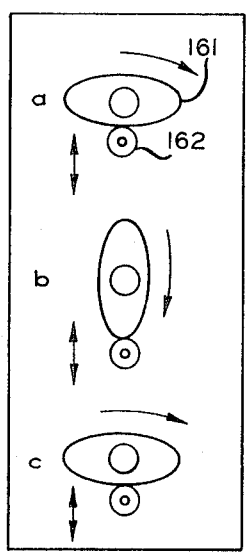
FIG. 8 shows the relationships of the cam of the apparatus of FIG. 7 through one cycle of operation.

FIG. 8 shows double lob cam 161 and the three stages of rotation of each cycle of operation. In Stage A valve 150 is opened for the first time and cam 161 is then rotated 90° to the position of Stage B at which stage cam follower 162 trips switch 140 from contact 141 to contact 142. When valve 150 reopens for the second time cam 161 is rotated another 90° to that shown in Stage C at which point switch 140 is retripped from contact 142 back to contact 141.

EXAMPLE

A 9 p.s.i.g. signal is fed into a Honeywell pulse transmitter (i.e., a variable duration pulse generator) Series 702 E 62 N having a maximum pulse rate of 540 pulses per hour, from which generator is obtained an electrical signal which is composed of a series of separate, electric pulses about 5 seconds in duration, the period of duration varying proportionally as the pneumatic signal fed into the generator varies in pressure magnitude. This variable duration signal is fed into an Industrial Timer Corporation recycling cam switch and a Cramer Type TEC–15S Style A time delay relay, the two components making up the integrator. An output electric signal is obtained from the integrator which is composed of a series of electrical pulses each pulse of which is 4 seconds. The start of each pulse is separated from the start of each preceding pulse by a time period of 13.3 seconds which time period varies proportionally with the increase or decrease of duration of the electrical pulses fed into the integrator. The output signal from the integrator is fed into a Westinghouse solenoid piloted air operated four-way valve Cat. No. PD4–41–9398 which controls the air flow to a Bettis Corporation Model 301 180° pneumatic rotary actuating mechanism with a 180° ratchet coupling which in turn is mechanically coupled to a ball check metering device like that of U.S. Pat. No. 3,167,398. The actuating mechanism in response to the signal from the integrator rotates the captive ball valve of the metering device through a cycle of rotation of the valve 90° in a given direction—pauses 2 seconds—then rotates the valve a second 90° in the same direction—then stops.

Reasonable variations and modifications are possible within the scope of this disclosure without departing from the spirit and scope thereof.

What is claimed is:

1. A method for producing a resultant signal composed of a series of pulses each having substantially equal time duration and each pulse being spaced from the other by a variable time interval, which resultant signal is in proportion as to its variable time interval to a first signal of a varying magnitude, comprising producing in response to said first signal an intermediate signal composed of a series of pulses each having a variable time duration in proportion to the magnitude of said first signal and each formed during one of a series of sequential time intervals, each time interval being of substantially equal length, and then producing in response to said intermediate signal said resulting signal.

2. The method according to claim 1 wherein said pulses of said intermediate signal are normally of a substantially equal time duration which is less than the length of one of said time intervals.

3. The method of claim 1 wherein said first signal is an electrical signal and wherein said intermediate and resultant signals are respective series of electrical pulses.

4. Apparatus for producing a resultant signal composed of a series of pulses each having a substantially equal time duration and each pulse being spaced from the other by a variable time interval, which resultant signal is in proportion as to its variable time interval to a first signal having a varying magnitude, comprising a variable duration pulse generator means for forming in response to said first signal an intermediate signal composed of a series of pulses each having a variable time duration in proportion to the magnitude of said first signal and each formed during one of a series of sequential time intervals, each said sequential time interval being of substantially equal length, and an integrator means connected to said pulse generator means for producing in response and in proportion to said intermediate signal said resultant signal.

5. The apparatus of claim 4 wherein said pulse generating means comprises means to establish a plurality of electrical pulses of constant duration and at a constant frequency, a gas accumulator, inlet conduit means to supply gas to said accumulator, outlet conduit means to remove gas from said accumulator, adjustable flow control means in said outlet conduit means to adjust the rate of removal of fluid from said accumulator, said adjustable flow control means being adapted to be adjusted by said first signal, means responsive to said plurality of electrical pulses to control flows through said inlet and outlet conduit means so as to pressure said accumulator at said constant frequency and to open said accumulator to said outlet conduit means at said constant frequency, and means to pass signals to said integrator means responsive to the pressure in said outlet conduit means.

6. The apparatus of claim 5 wherein said means to pass signals to said integrator comprises a source of electrical energy, circuit means connected to said source, a switch in said circuit means, and pressure responsive means connected to said outlet conduit means to close said switch whenever the pressure in said outlet conduit means exceeds a predetermined value.

7. The apparatus of claim 4 wherein said integrator means comprises a motor connected to said pulse generating means, at least one cam connected to said motor to be rotated thereby, a power source, circuit means connected to said power source to provide said resultant signal, a switch in said circuit means, and means responsive to said at least one cam to close said switch when said motor has rotated a predetermined amount and to rotate said motor an additional amount to open said switch.

8. Signal generating apparatus comprising means to establish a plurality of electrical pulses of constant duration and at a constant frequency, a gas accumulator, inlet conduit means to supply gas to said accumulator, outlet conduit means to remove gas from said accumulator, adjustable flow control means in said outlet conduit means to adjust the rate of removal of fluid from said accumulator, said adjustable flow control means being adapted to be adjusted by an input signal, means responsive to said plurality of electrical pulses to control flows through said inlet and outlet conduit means so as to pressure said accumulator at said constant frequency and to open said accumulator to said outlet conduit means at said constant frequency, and means to establish an output signal whenever the pressure in said outlet conduit means exceeds a predetermined value.

9. The apparatus of claim 8 wherein said means to establish an output signal comprises a source of electrical energy, circuit means connected to said source, a switch in said circuit means, and pressure responsive means connected to said outlet conduit means to close said switch whenever the pressure in said outlet conduit means exceeds a predetermined value.

* * * * *